United States Patent
Paryani

(10) Patent No.: US 8,552,693 B2
(45) Date of Patent: Oct. 8, 2013

(54) LOW TEMPERATURE CHARGING OF LI-ION CELLS

(75) Inventor: Anil Paryani, Cerritos, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 358 days.

(21) Appl. No.: 12/570,640

(22) Filed: Sep. 30, 2009

(65) Prior Publication Data

US 2011/0012562 A1   Jan. 20, 2011

Related U.S. Application Data

(60) Provisional application No. 61/226,636, filed on Jul. 17, 2009.

(51) Int. Cl.
*H02J 7/04* (2006.01)

(52) U.S. Cl.
USPC ........... 320/152; 320/157; 320/160; 320/162; 320/104; 323/907

(58) Field of Classification Search
USPC ....................................................... 320/152
See application file for complete search history.

(56) References Cited

U.S. PATENT DOCUMENTS

| | | | | |
|---|---|---|---|---|
| 6,225,780 | B1 * | 5/2001 | Koch | 320/118 |
| 6,563,290 | B2 * | 5/2003 | Sakakibara et al. | 320/106 |
| 6,765,372 | B2 * | 7/2004 | Isham | 323/224 |
| 6,902,319 | B2 * | 6/2005 | Wu et al. | 374/141 |
| 7,777,446 | B2 * | 8/2010 | Ueda et al. | 320/104 |
| 2002/0149357 | A1 * | 10/2002 | Morimoto et al. | 324/150 |
| 2009/0160405 | A1 * | 6/2009 | Takeda et al. | 320/152 |

* cited by examiner

*Primary Examiner* — Yalkew Fantu
(74) *Attorney, Agent, or Firm* — J. Richard Soderberg

(57) ABSTRACT

A battery cell charging system, including a charger and a controller, for low-temperature (below about zero degrees Celsius) charging a lithium ion battery cell, the battery cell charging system includes: a circuit for charging the battery cell using an adjustable voltage charging-profile to apply a charging voltage and a charging current to the battery cell wherein the adjustable voltage charging-profile having: a non-low-temperature charging stage for charging the battery cell using a charging profile adapted for battery cell temperatures above about zero degrees Celsius; and a low-temperature charging stage with a variable low-temperature stage charging current that decreases responsive to a battery cell temperature falling below zero degrees Celsius.

16 Claims, 5 Drawing Sheets

LOW TEMPERATURE CHARGING OF LI-ION CELLS

CROSS REFERENCE TO RELATED APPLICATIONS

This application claims the benefit of U.S. Provisional Application No. 61/226,636, filed 17 Jul. 2009, the contents of which are expressly incorporated in their entirety for all purposes.

BACKGROUND OF THE INVENTION

The present invention relates generally to rechargeable lithium-ion-type chemistry batteries, and more specifically to temperature dependent charging of automotive Li-ion battery packs, particularly to "low temperature" charging.

The defense, automotive and aerospace applications include operation at extreme temperature ranges beyond those used in the consumer electronics. For example, in an application for an electric vehicle, the user will expect that the automobile will be operational at low temperature. This operation includes an expectation for being able to recharge the batteries used in the vehicle. Beyond meeting consumer expectations, it is an important safety consideration to enable the vehicle to operate in lower temperature ranges. For purposes of this application, low temperature is defined at temperatures less than about zero degrees Celsius.

Lithium ion batteries are common in consumer electronics. They are one of the most popular types of battery for portable electronics, with one of the best energy-to-weight ratios, no memory effect, and a slow loss of charge when not in use. In addition to uses for consumer electronics, lithium-ion batteries are growing in popularity for defense, automotive, and aerospace applications due to their high energy and power density. However, certain kinds of treatment may cause Li-ion batteries to fail in potentially dangerous ways.

One of the advantages of use of a Li-ion chemistry is that batteries made using this technology are rechargeable. Traditional charging is done with a two-step charge algorithm: (i) constant current (CC), and (ii) constant voltage (CV). In electric vehicles (EVs), the first step could be constant power (CP).

Step 1: Apply charging current limit until the volt limit per cell is reached.

Step 2: Apply maximum volt per cell limit until the current declines below a predetermined level (often C/20 but sometimes C/5 or C/10 or other value).

The charge time is approximately 1-5 hours depending upon application. Generally cell phone type of batteries can be charged at 1 C, laptop types 0.8 C. The charging typically is halted when the current goes below C/10. Some fast chargers stop before step 2 starts and claim the battery is ready at about a 70% charge. (As used herein, "C" is a rated current that discharges the battery in one hour.)

Generally for consumer electronics, lithium-ion is charged with approximate 4.2±0.05 V/cell. Heavy automotive, industrial, and military application may use lower voltages to extend battery life. Many protection circuits cut off when either >4.3 V or 90° C. is reached.

Battery chargers for charging lithium-ion-type batteries are known in the art. As is known in the art, such lithium ion batteries require constant current (CC) and constant voltage (CV) charging. In particular, initially such lithium ion batteries are charged with a constant current. In the constant current mode, the charging voltage is typically set to a maximum level recommended by the Li-ion cell manufacturer based on safety considerations, typically 4.2V per cell. The charging current is a factor of design level, based on the cell capability, charge time, needs and cost. Once the battery cell voltage rises sufficiently, the charging current drops below the initial charge current level. In particular, when the battery cell voltage Vb approaches the charging voltage Vc, the charging current tapers according to the formula: I=(Vc−Vb)/Rs, where I=the charging current, Vc=the charging voltage, Vb=the battery cell open circuit voltage and Rs=the resistance of the charging circuit including the contact resistance and the internal resistance of the battery cell. As such, during the last portion of the charging cycle, typically about the last ⅓, the battery cell is charged at a reduced charging current, which means it takes more time to fully charge the battery cell.

The closed-circuit voltage represents the voltage of the battery cell plus the voltage drops in the circuit as a result of resistance in the battery circuit, such as the battery terminals and the internal resistance of the battery cell. By subtracting the closed-circuit voltage from the open-circuit voltage, the voltage drop across the battery resistance circuit elements can be determined.

Various known battery chargers use this voltage drop to drive the battery charging voltage during a constant current mode in order to increase the Ampere-hour (Ah) applied to the battery cell during a constant current mode. By increasing the Ah applied to the battery cell during a constant current mode, the battery cell is charged much faster.

It is known to include lithium ion battery charger circuits that compensate for the voltage rise in the battery circuit in order to increase the charging current and thus decrease the charging time for a lithium ion battery. The compensation circuit can be based on an assumed initial voltage drop across the various resistance elements in the circuit and compensates for this voltage drop to maintain a predetermined charging current during a constant current charging mode. Unfortunately, the resistance of the various resistance elements change over time due to various factors including oxidation of the external battery contacts used to connect the battery cell to the battery charger. Accordingly, in time, the charging time of the battery cell increases.

Most lithium-ion battery manufacturers produce specifications for their batteries that do not include a provision for charging at low temperatures (that is, charging is stopped when a cell temperature falls below a certain threshold (typically zero degrees C.)). Traditionally charging a lithium-ion battery at less than zero degrees C. at normal rates and voltages causes lithium plating on the anode which degrades cycle life. This hasn't been an in issue in consumer electronic applications. However, in automotive applications this is unacceptable since the automobile is a safety critical and convenient product operating in the extremes. Also, the battery packs used in electric vehicles are quite sophisticated and typically have a high cost to replace. Manufacturers and consumers both desire to preserve the life cycle of these battery packs.

What is needed is a battery charger and battery charging process for extending a charging profile for a lithium-ion battery pack to include low temperature charging.

BRIEF SUMMARY OF THE INVENTION

Disclosed is a battery charger and battery charging process for extending a charging profile for a lithium-ion battery pack to include low temperature charging. The preferred embodiments do not include temperature independent current and voltage steps.

A battery cell charging system, including a charger and a controller, for low-temperature (below about zero degrees Celsius) charging a lithium ion battery cell, the battery cell charging system includes: a circuit for charging the battery cell using an adjustable voltage charging-profile to apply a charging voltage and a charging current to the battery cell wherein the adjustable voltage charging-profile having: a non-low-temperature charging stage for charging the battery cell using a charging profile adapted for battery cell temperatures above about zero degrees Celsius; and a low-temperature charging stage with a variable low-temperature stage charging current that decreases responsive to a battery cell temperature falling below zero degrees Celsius.

A battery cell charging system for low-temperature (below about zero degrees Celsius) charging a lithium ion battery cell, the battery cell charging system including: a circuit for charging the battery cell using a variable charge-profile to apply a charging voltage and a charging current to the battery cell wherein the charge-profile is determined responsive to an imaginary $R_{Bad}$ resistance included in series with an DCR resistance of a DC model for the battery cell wherein the $R_{Bad}$ is a function including a component responsive to a battery cell temperature less than about zero degrees Celsius such that $V_{cell}$ is about equal to a maximum battery cell voltage minus charging current times $R_{Bad}$.

A battery cell charging method for low-temperature (below about zero degrees Celsius) charging a lithium ion battery cell, the battery cell charging method including: (a) applying, to the battery cell when a temperature of the battery cell is above about zero degrees Celsius, a non-low-temperature charging profile; and (b) applying, to the battery cell when a temperature of the battery cell is below about zero degrees Celsius, a variable low-temperature stage charging current that decreases responsive to a battery cell temperature falling below zero degrees Celsius.

A battery cell charging method for low-temperature (below about zero degrees Celsius) charging a lithium ion battery cell, the battery cell charging method including: (a) applying, responsive to a charge-profile, a varying charging voltage and a varying charging current to the battery cell wherein the charge-profile is determined responsive to an imaginary $R_{Bad}$ resistance included in series with an DCR resistance of a DC model for the battery cell wherein the $R_{Bad}$ is a function including a component responsive to a battery cell temperature less than about zero degrees Celsius such that:

$$V_{Cell} \approx \text{TARGET\_VOLTAGE} - iBat \cdot R_{Bad}. \quad (1)$$

As noted above, typically, a li-ion battery cell is charged using a two step CC-CV (constant-current constant voltage) algorithm. For high energy cells, CC is typically 1 C or less and CV is between 4.1V and 4.2V.

When chargers and charging methods of the prior art are used for fast charging, cycle life degradation that occurs when the cell is charged at high rates (above 1 C for typical consumer 18650 cells and other energy cells) and at high voltages as the prior art inventions mentioned previously. By modifying the apparatus and process to include a four (or more) steps cycle life degradation even at 2 C charge rates is reduced. The multistate charge-profile as follows was employed with minimal cycle degradation: 2 C, 4.0V (hold until 0.7 A), 0.7 A, 4.2V (CC-CV-CC-CV). While an n-step adjustable charge profile (n=4) is described, n may have other values. Prior art systems use a two-stage profile having a constant current stage 1 applied until cell voltage limit is reached, and then a constant voltage stage 2 at max cell voltage is applied until a "full" charge is reached. The present embodiments insert one or more intermediate charging stages that improve charging rate without degrading battery performance. The intermediate stages include one or more of constant voltage stages (iBat is decreasing) or constant current as battery charge voltage increases or an intermediate stage where higher current is used due to the cell chemistry or the temperature that happens to occur at some point during charge.

In a particular implementation, the battery may be modeled to decrease charging current as battery voltage increases. The model may include an $R_{Bad}$ that allows improved charging rates without the negative consequences. The model would represent $R_{Bad}$ as a function of the various physical parameters that can negatively affect cycle life. For example, $R_{Bad}$ could partially represent the polarization of the negative electrode ($R_{anode}$). As $R_{anode}$ increases, the likelihood of lithium plating on the anode is increased, thereby leading to capacity fade in the battery. So from a modeling perspective, the parameters that affect $R_{anode}$, such as temperature (including low-temperature), cell age and state of charge can appropriately be adjusted in the charge algorithm to prevent cell damage. There are several examples of these physical, cell level parameters that affect $R_{Bad}$ such electrolyte type, electrode design, and anode material. All of these parameters can be experimentally determined and therefore properly modeled to show their effect on a $R_{Bad}$ value.

One source of capacity degradation consequent to low-temperature charging results from side reactions in the negative electrode (i.e., lithium plating). Reducing the charge currents when battery cell temperature is low minimizes the side reactions and thereby reduces degradation due to low-temperature charging.

Use of the low-temperature charging profiles makes electric-powered devices more readily available. In conventional systems, either a user would forego charging at low temperatures or the manufacturer of the device would include more complex and costly systems to enable charging, such as battery heaters. The low temperature charging thus permits greater availability or reduced cost, or both, depending upon previous solutions.

Other advantages of the present invention will be seen by review of the present disclosure.

DETAILED DESCRIPTION OF THE INVENTION

Embodiments of the present invention provide a system and method for a low-temperature charger, particularly for lithium-ion battery cells while reducing/eliminating the impact of low-temperature charging on cycle life. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
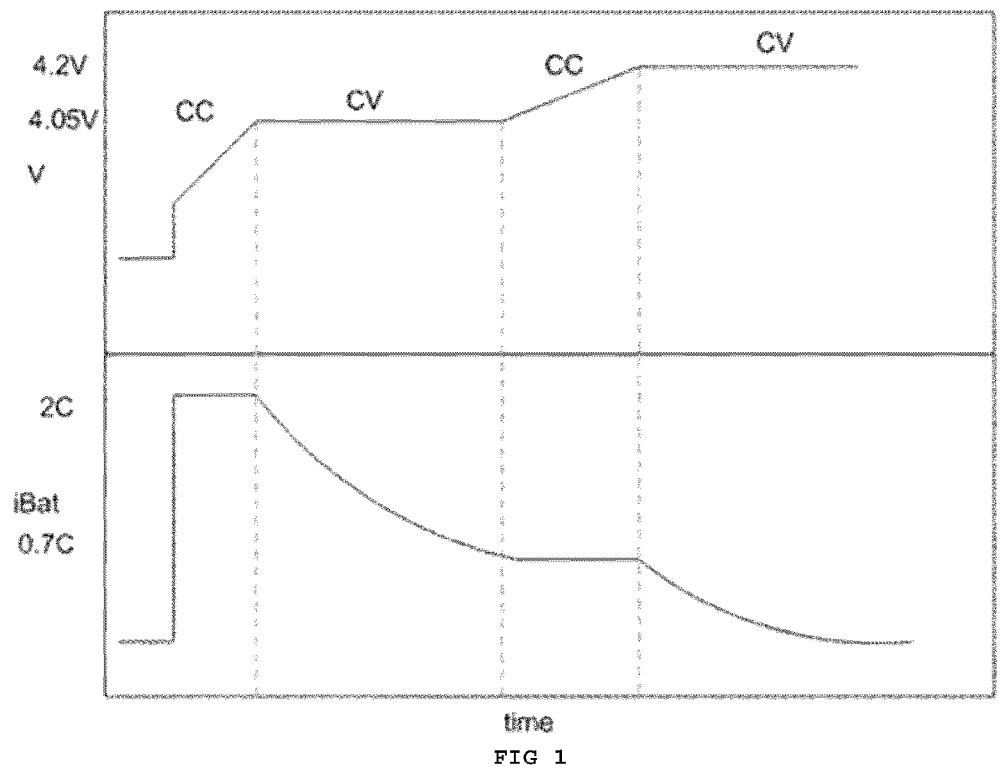
FIG. 1 is a chart of a simplified multistage (4 stage) fast charge profile for a battery charger.

FIG. 1 is a chart of a simplified multistage fast charge profile for a battery charger. The preferred embodiment for the fast charge profile includes at least four stages: a CC (constant current) first stage, a constant voltage (CV) second stage; a CC third stage, and a CV fourth stage.

The first stage includes CC at a level greater than the typical prior art value of 1 C. The first stage voltage varies from an initial value less than the cell target voltage to about 4.0V to about 4.05V. These are representative values but the actual value depends upon an impedance of the battery cell being charged. A lower impedance battery cell is able to be charged at higher voltages without degradation. The actual value also depends upon the maximum cell voltage, so the first stage target voltage may be a percentage of the maximum voltage, for example 80% SOC.

The second stage includes CV at the charging voltage level reached at the end of the first stage (e.g., 4.0-4.05 volts). During the second stage, the charging current declines from the first stage value of (preferably) 2 C to about 0.7 C.

The third stage includes CC at the second stage level while the charging voltage of the third stage increases to about the cell target voltage.

The fourth stage includes CV at about the cell target voltage while the charging current of the fourth stage declines. When the charging current of the fourth stage declines below a predetermined level, then the charging cycle is complete. These values are determined by application, typically C/10, sometimes C/5 or C/20. In an EV, C/70 could be the charging level.

Figure 2:
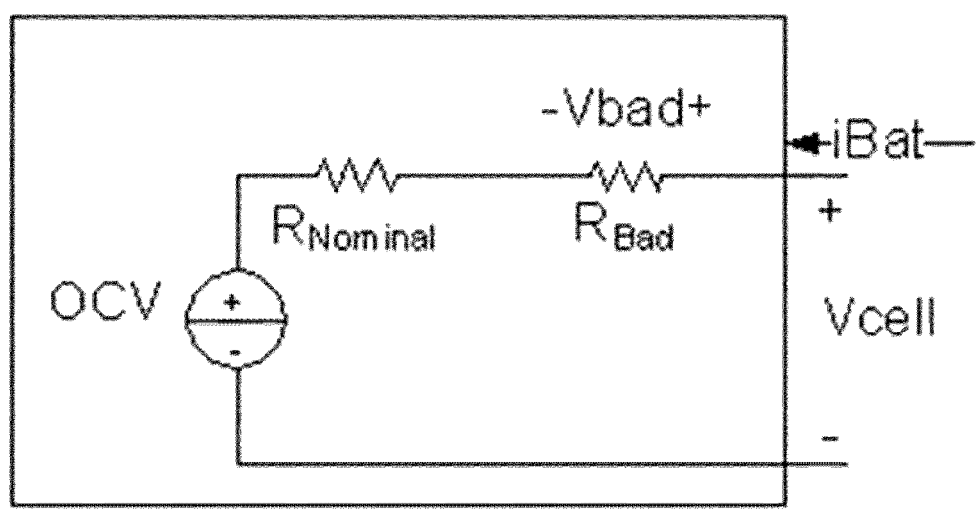
FIG. 2 is a schematic diagram of a DC model of a lithium-ion battery cell including an imaginary $R_{Bad}$ element.

FIG. 2 is a schematic diagram of a DC model of a lithium-ion battery cell including an imaginary $R_{Bad}$ element. The use of the $R_{Bad}$ element permits a different embodiment to produce a continually variable voltage charging profile as compared to FIG. 1 that produces a similar performance but may result in improved cycle life by lowing a voltage point where a final voltage taper begins. $R_{Bad}$, by taking into account battery age or a high impedance state, improves cycle life because lithium plating occurrence is directly related to battery age and the high impedance state.

In general, as impedance increases (with age, cycles, low temperatures), the voltage target can decrease. $R_{Bad}$ is introduced into a DC battery cell model to describe a charging method that defines an adjustable voltage level and SOC (state-of-charge) point at which taper begins. The models for the battery (e.g., $R_{Bad}$ and $V_{Negative\_Anode}$) are ways to mathematically determine, and to use in control systems, when excessively high charging currents at those cell conditions may cause irreversible capacity loss.

Figure 3:
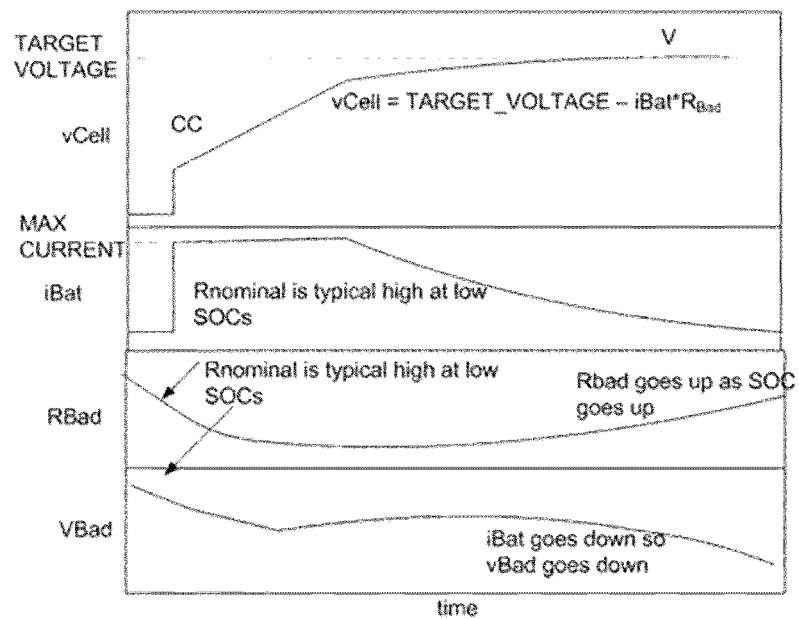
FIG. 3 is a variable fast charge profile for a battery charger responsive to the $R_{Bad}$ element shown in FIG. 2.

FIG. 3 is a variable fast charge profile for a battery charger responsive to the $R_{Bad}$ element shown in FIG. 2. Initially the profile includes a CC (or alternatively CP) at maximum current (which in some cases can be 5 C or greater) and an increasing charging voltage $V_{cell}$. $V_{cell}$ is equal to the target voltage minus iBat times $R_{Bad}$. The $R_{Bad}$ element controls the tapering of the charging current and the charging voltage because iBat decreases as $V_{Bad}$ goes down and $R_{Bad}$ goes up as SOC increases. These relationships are shown in FIG. 3.

$R_{Bad}$ of the preferred embodiment is based on a percentage of DC Resistance (DCR). At 25 degrees C., DCR is $R_{Nominal}$, but as the preferred embodiments address charging at other than nominal temperature, the value DCR is used. As an example, $R_{Bad}$=k1×DCR+f(SOC) where f(SOC) is a function/lookup table using SOC as an input. For example, k1 is between 0 and 1 (typically around 0.1) and f(SOC) could be k2×SOC where k2 is typically around 0.001/SOC %. More generically, $R_{Bad}$ may be described as a function g(SOC, Temperature, DCR) and could also be a function of age, although typically as a battery ages its nominal impedance goes up. DCR varies based on battery cell temperature, age and SOC. DCR may be determined in different ways, such as, for example, by look-up table or calculated in real-time. Generally, $R_{Bad}$ is directly related to DCR and SOC and inversely related to temperature. With this approach targetV=TARGET_VOLTAGE−$V_{Bad}$. TARGET_VOLTAGE is the final voltage that one wants to achieve at the end of charge for each cell in the battery pack, typically 4.2V, and $V_{Bad}$ is iBat times $R_{Bad}$. Table I provides representative values in the example of an electric vehicle having a 4.18V target voltage and a 150 Ah capacity battery.

TABLE I

| SOC | DCR (mOhm) | $R_{Bad}$ (mOhm) | OCV | iBat | vBad |
|---|---|---|---|---|---|
| 0 | 18 | 1.8 | 3 | 60.6 | 0.20 |
| 10 | 12 | 1.21 | 3.4 | 60.6 | .073 |
| 20 | 9 | 0.92 | 3.5 | 70.6 | 0.065 |
| 30 | 7.5 | 0.78 | 3.6 | 72.5 | 0.056 |
| 40 | 6 | 0.64 | 3.7 | 75.3 | 0.048 |
| 50 | 4.5 | 0.5 | 3.8 | 80.0 | 0.040 |
| 60 | 4.5 | 0.51 | 3.85 | 68.8 | 0.036 |
| 70 | 4.5 | 0.52 | 3.9 | 59.8 | 0.031 |
| 80 | 4.5 | 0.53 | 4 | 39.8 | 0.021 |
| 90 | 4.5 | 0.54 | 4.1 | 19.0 | 0.010 |
| 100 | 4.5 | 0.65 | 4.18 | 0.0 | 0.000 |

Another implementation method is based on the estimated anode voltage referenced to Li+. It believed that, in present li-ion technology, fast charging damages the anode when its voltage drops towards 0V referenced to Li+. So $R_{Bad}$ could also be a function of $V_{Negative\_Electrode\_Loaded}$, where $V_{Negative\_Electrode\_Loaded}$=$V_{Negative\_Electrode\_ToLi}$−current×$r_{Negative\_Electrode}$.

Figure 4:
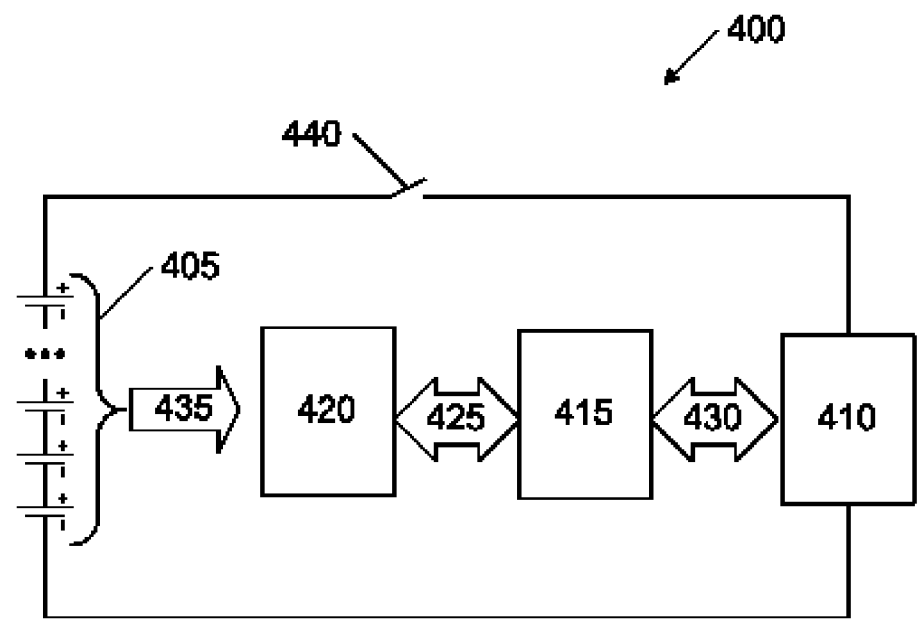
FIG. 4 is a representative charging system.

FIG. 4 is a preferred embodiment for a charging system 400, such as may be used in an electric vehicle. System 400 includes a battery 405, a charger 410 coupled to battery 405 and a battery management system (BMS) 415 and a battery data acquisition and monitoring subsystem 420. A communication bus 425 couples subsystem 420 to BMS 415 and a communication bus 430 couples BMS 415 to charger 410. A communication bus 435 couples battery data from battery 405 to subsystem 420.

Battery 405 is shown as a series-connected group of battery cells, however the arrangement of cells may be a combination of parallel/series connected cells of many different arrangements. Charger 410 of the preferred embodiment provides the charging current applied to battery 405. BMS 415 controls the charging current according to a profile established by the embodiments of the present invention. Subsystem 420 acquires the desired data as described herein regarding battery 405. For example, voltage, SOC, temperature, and other applicable data used by BMS 415. In some embodiments, subsystem 420 may be part of BMS 415 and BMS 415 may be part of charger 410. One or more of charger 410, BMS 415, and subsystem 420 control a switch 440.

Figure 5:
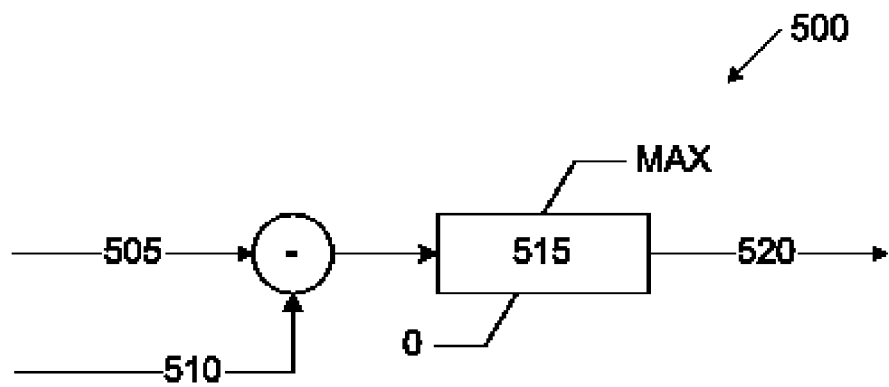
FIG. 5 is a control diagram for the charging system shown in FIG. 4.

FIG. 5 is a control diagram 500 for the charging system shown in FIG. 4. Diagram 500 describes a typical control system as may be used for charging lithium ion cells. A target voltage 505 and a maximum cell voltage 510 are subtracted and used by a controller 515 to produce a charging current 520. In prior art systems, current 520 is constant or compensates for an internal resistance (IR) drop of battery 405. As described above, the preferred embodiments of the present invention describe an adjusting charging current. In broad terms, as the voltage of the battery increases, the charging current decreases in a particularly controlled manner to provide for fast charging without degrading battery performance.

Figure 6:
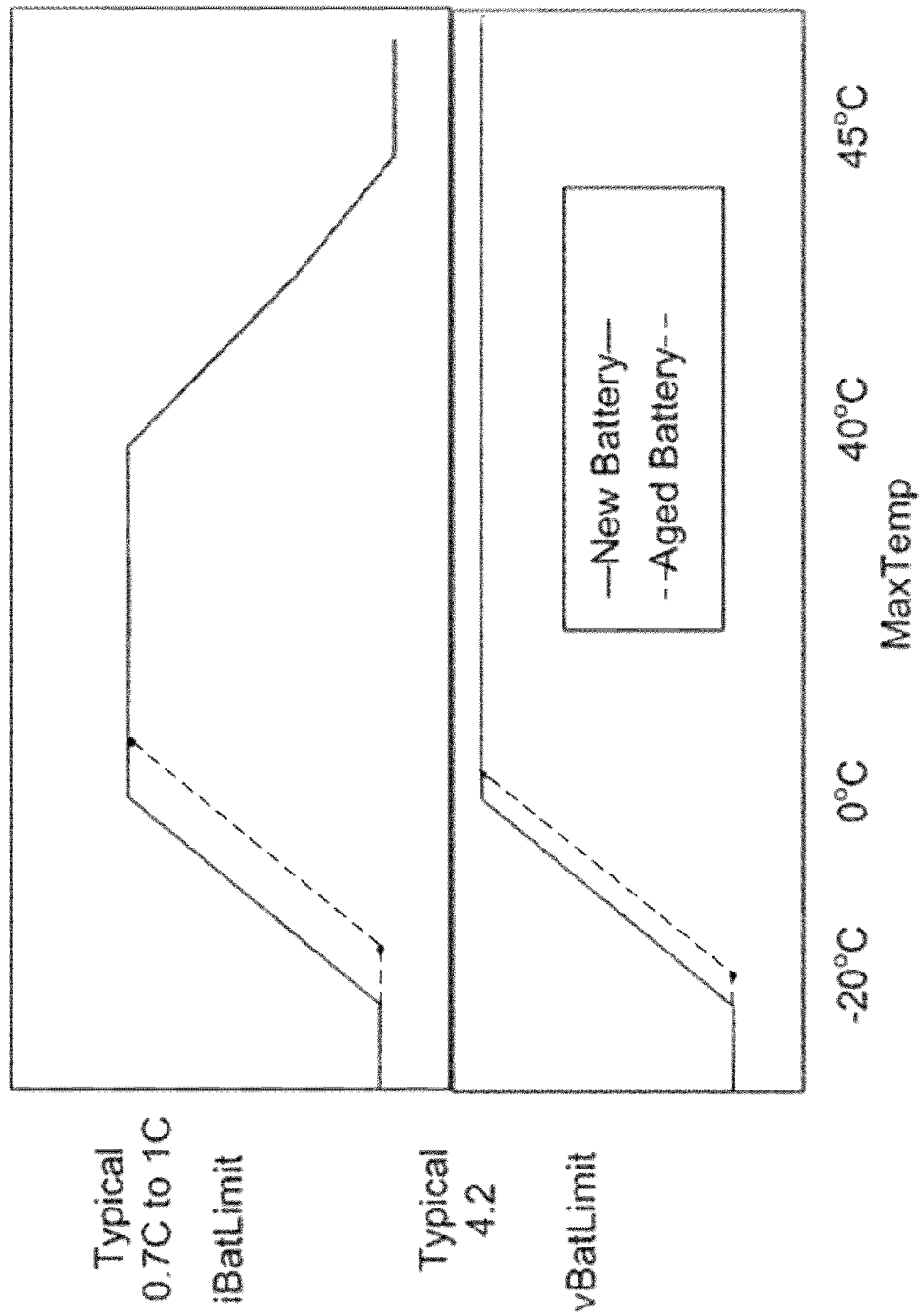
FIG. 6 is an illustration of a low-temperature charging profile for use with the charging system shown in FIG. 4.

FIG. 6 is an illustration of a low-temperature charging profile for use with the charging system shown in FIG. 4. In contrast to conventional Li-ion battery chargers that use a conventional two-step charge sequence that is stopped when battery cell temperature falls below the low-temperature threshold (typically zero degrees Celsius), there are no temperature independent current and voltage steps. As the battery cell temperature goes down the charge current and voltage is reduced. FIG. 6 relates charge current and charge voltage limit to temperature according to one embodiment of the present invention. As illustrated, at the typical low temperature threshold, the embodiment of FIG. 6 begins to decrease iBatLimit and vBatLimit. Limits shown in FIG. 6 may, additionally and optionally, be based on an age of the battery cell since the Li-ion battery cell's impedance increases with age.

Figure 7:
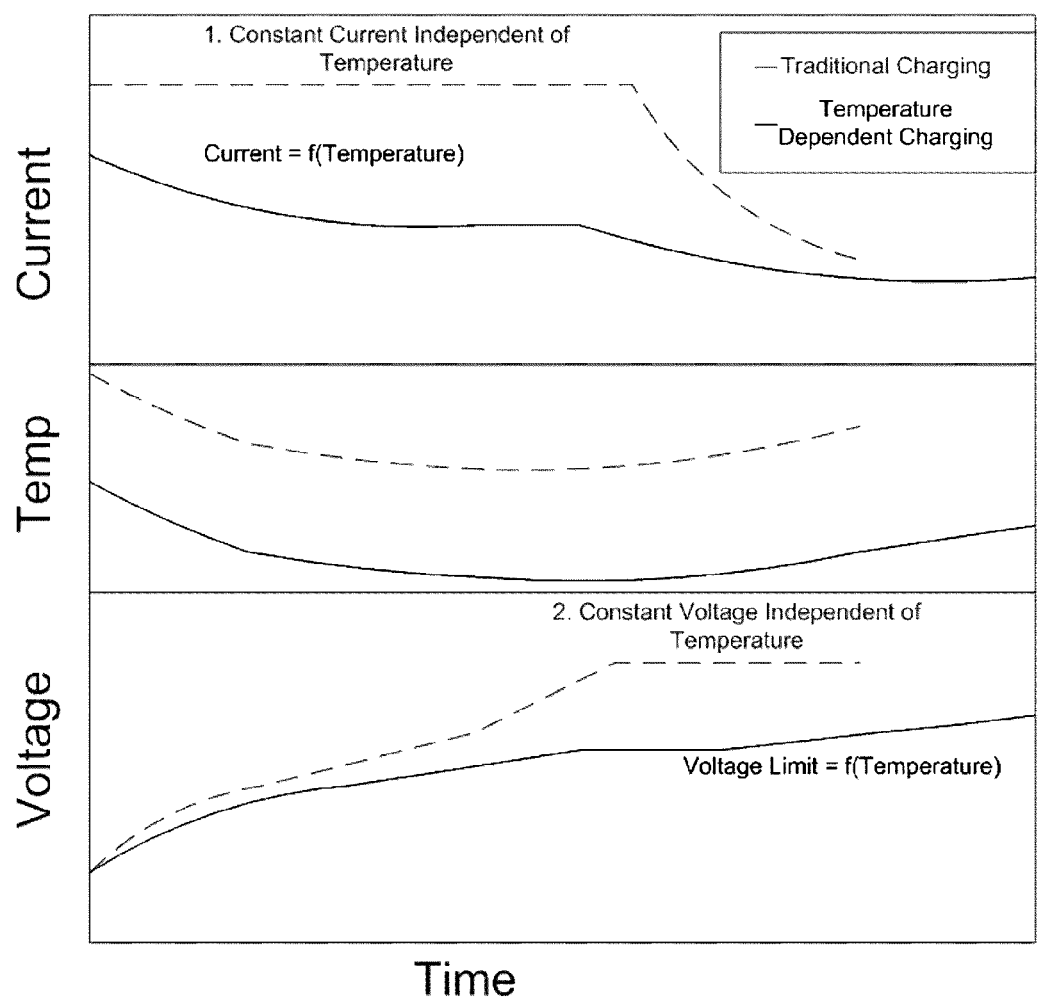
FIG. 7 is a variable low-temperature charge profile for a battery charger responsive to the $R_{Bad}$ element shown in FIG. 2.

FIG. 7 is a variable low-temperature charge profile for a battery charger responsive to the $R_{Bad}$ element shown in FIG. 2. In this embodiment, $R_{Bad}$ is modeled to include estimations of low-temperature conditions of the battery cell. FIG. 7 also illustrates a difference between conventional charging and low-temperature charging.

The system above has been described in the preferred embodiment of an embedded automobile (EV) electric charging system. The system, method, and computer program product described in this application may, of course, be embodied in hardware; e.g., within or coupled to a Central Processing Unit ("CPU"), microprocessor, microcontroller, System on Chip ("SOC"), or any other programmable device. Additionally, the system, method, and computer program product, may be embodied in software (e.g., computer readable code, program code, instructions and/or data disposed in any form, such as source, object or machine language) disposed, for example, in a computer usable (e.g., readable) medium configured to store the software. Such software enables the function, fabrication, modeling, simulation, description and/or testing of the apparatus and processes described herein. For example, this can be accomplished through the use of general programming languages (e.g., C, C++), GDSII databases, hardware description languages (HDL) including Verilog HDL, VHDL, AHDL (Altera HDL) and so on, or other available programs, databases, nanoprocessing, and/or circuit (i.e., schematic) capture tools. Such software can be disposed in any known computer usable medium including semiconductor (Flash, or EEPROM, ROM), magnetic disk, optical disc (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets. A system, method, computer program product, and propagated signal embodied in software may be included in a semiconductor intellectual property core (e.g., embodied in HDL) and transformed to hardware in the production of integrated circuits. Additionally, a system, method, computer program product, and propagated signal as described herein may be embodied as a combination of hardware and software.

One of the preferred implementations of the present invention is as a routine in an operating system made up of programming steps or instructions resident in a memory of a computing system as well known, during computer operations. Until required by the computer system, the program instructions may be stored in another readable medium, e.g. in a disk drive, or in a removable memory, such as an optical disk for use in a CD ROM computer input or other portable memory system for use in transferring the programming steps into an embedded memory used in the charger. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media in a variety of forms.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, and the like. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A charging system, comprising:
   a lithium ion energy storage element;
   a charger; and
   a battery management system that (i) determines when the lithium ion energy storage element has a temperature below 32 degrees Fahrenheit, and (ii) in response to the determination, applies a charging profile that sets a temperature-dependent current limit and a temperature-dependent voltage limit for the charger, wherein when the lithium ion energy storage element does not have the temperature below 32 degrees Fahrenheit, the battery management system applies a temperature-independent current limit, at least up to a maximum temperature, and a temperature-independent voltage limit.

2. The charging system of claim 1, wherein the maximum temperature is 104 degrees Fahrenheit.

3. The charging system of claim 1, wherein a DC model for the lithium ion energy storage element includes an imaginary $R_{Bad}$ resistance in series with an $R_{Nominal}$ resistance, wherein said $R_{Bad}$ includes a function component responsive to one or more of said $R_{Nominal}$, a state-of-charge (SOC) of the lithium ion energy storage element, and a temperature of the lithium ion energy storage element such that $V_{cell}$ is about equal to a maximum battery cell voltage minus charging current times $R_{Bad}$, wherein the circuit adjusts $R_{Bad}$ over time using the function component so that a change in resistance of the battery cell is compensated for.

4. The charging system of claim 3, wherein said $R_{Bad}$ includes a component that is about equal to a first constant k1 times $R_{Nominal}$ minus a second constant k2 times SOC wherein said first constant k1 is about between 0 and 1 and wherein said second constant k2 is about 0.001/SOC %.

5. The charging system of claim 4, wherein said first constant k1 is about equal to 0.1.

6. The charging system of claim 3, wherein said $R_{Nominal}$ is determined from a lookup table responsive to cell temperature, age, and SOC.

7. The charging system of claim 3, wherein said $R_{Bad}$ is determined from a lookup table responsive to cell temperature, age, and SOC.

8. The charging system of claim 3, wherein said $R_{Bad}$ is estimated in real-time or over time.

9. A charging method, comprising:
   determining when a lithium ion energy storage element in a charging system has a temperature below 32 degrees Fahrenheit;
   in response to the determination, applying a charging profile that sets a temperature-dependent current limit and a temperature-dependent voltage limit for a charger of the charging system; and
   when the lithium ion energy storage element does not have the temperature below 32 degrees Fahrenheit, applying a temperature-independent current limit, at least up to a maximum temperature, and a temperature-independent voltage limit.

10. The charging method of claim 9, wherein the maximum temperature is 104 degrees Fahrenheit.

11. The charging method of claim 9, wherein a DC model for the lithium ion energy storage element includes an imaginary $R_{Bad}$ resistance in series with an $R_{Nominal}$ resistance, wherein said $R_{Bad}$ includes a function component responsive to one or more of said $R_{Nominal}$, a state-of-charge (SOC) of the lithium ion energy storage element, and a temperature of the lithium ion energy storage element such that $V_{cell}$ is about equal to a maximum battery cell voltage minus charging current times $R_{Bad}$, wherein the circuit adjusts $R_{Bad}$ over time using the function component so that a change in resistance of the battery cell is compensated for.

12. The charging method of claim 11, wherein said $R_{Bad}$ includes a component that is about equal to a first constant k1 times $R_{Nominal}$ minus a second constant k2 times SOC wherein said first constant k1 is about between 0 and 1 and wherein said second constant k2 is about 0.001/SOC %.

13. The charging method of claim 12, wherein said first constant k1 is about equal to 0.1.

14. The charging method of claim 11, wherein said $R_{Nominal}$ is determined from a lookup table responsive to cell temperature, age, and SOC.

15. The charging method of claim 11, wherein said $R_{Bad}$ is determined from a lookup table responsive to cell temperature, age, and SOC.

16. The charging method of claim 11, wherein said $R_{Bad}$ is estimated in real-time or over time.

\* \* \* \* \*